United States Patent [19]
Adler

[11] Patent Number: 5,850,141
[45] Date of Patent: Dec. 15, 1998

[54] ANNULAR SPEED SENSOR WITH A TONE RING HAVING BOTH AXIAL AND RADIAL MAGNETIC FIELDS

[75] Inventor: Jonathan M. Adler, Dexter, Mich.

[73] Assignee: NTN Corporation, Osaka, Japan

[21] Appl. No.: 876,053

[22] Filed: Jun. 13, 1997

[51] Int. Cl.[6] ............................. G01P 3/487; G01P 3/488; F16C 32/00; F16C 19/00
[52] U.S. Cl. ............... 324/174; 324/207.22; 324/207.12; 384/448
[58] Field of Search ..................................... 324/173, 174, 324/207.25, 207.12, 207.15, 207.16, 207.22; 384/448; 310/156, 168, 68 B; 188/181 R

[56] References Cited

U.S. PATENT DOCUMENTS

| | | |
|---|---|---|
| 3,500,091 | 3/1970 | Jones . |
| 3,742,243 | 6/1973 | Gamble . |
| 4,259,637 | 3/1981 | Bloomfield et al. . |
| 4,646,088 | 2/1987 | Inoue . |
| 4,656,377 | 4/1987 | Akiyama et al. . |
| 4,948,277 | 8/1990 | Alff . |
| 4,968,156 | 11/1990 | Hajzler . |
| 5,004,358 | 4/1991 | Varvello et al. . |
| 5,200,697 | 4/1993 | Adler et al. . |

FOREIGN PATENT DOCUMENTS

| | | |
|---|---|---|
| 1504791 | 3/1978 | United Kingdom . |
| 1604862 | 12/1981 | United Kingdom . |
| 2204646 | 11/1988 | United Kingdom . |
| 2207470 | 2/1989 | United Kingdom . |

*Primary Examiner*—Walter E. Snow
*Attorney, Agent, or Firm*—Harness, Dickey & Pierce P.L.C.

[57] ABSTRACT

An annular wheel speed sensor having an efficient magnetic configuration to provide a high level of electrical output even at relatively low wheel speeds. The sensor comprises a magnetic tone ring having both axial and radial magnetic fields and a stator configured to read both the axial and radial magnetic fields as the tone ring rotates. The sensor is configured to minimize the effects of variation in the axial air gap between the tone ring and stator to provide an accurate and reliable wheel speed signal. The wheel speed sensor incorporates many of the bearing components to provide a compact and efficient hub and bearing assembly. Moreover, the construction of the hub and bearing of the invention provides a sealed environment for the speed sensor, isolating it from environmental factors.

18 Claims, 6 Drawing Sheets

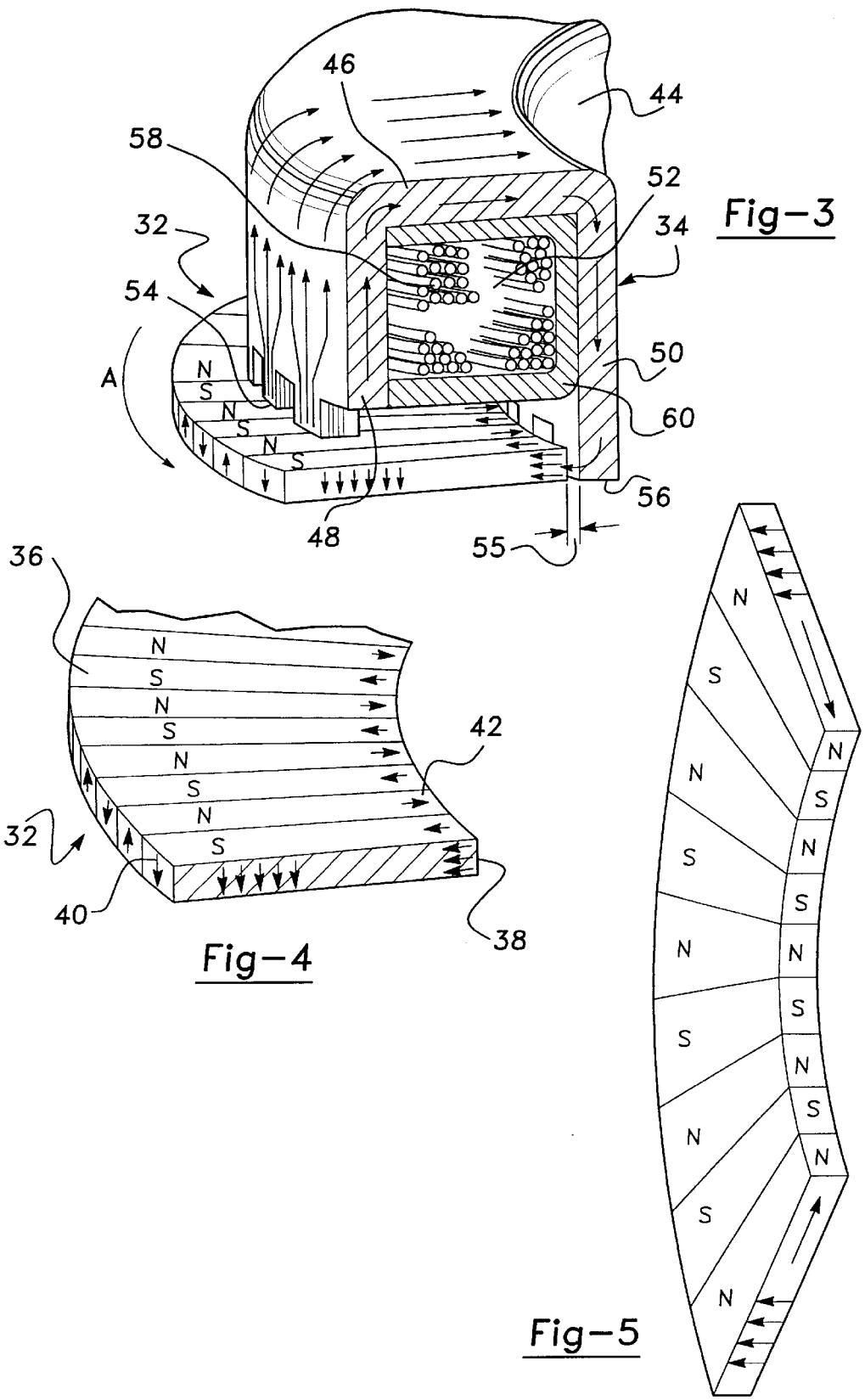

ANNULAR SPEED SENSOR WITH A TONE RING HAVING BOTH AXIAL AND RADIAL MAGNETIC FIELDS

FIELD OF THE INVENTION

The present invention relates to rotational speed sensors. More particularly, the present invention relates to rotational speed sensors enclosed in a vehicle bearing assembly and adapted for use on a motor vehicle for detecting the rotational speed of a ground engaging wheel.

BACKGROUND OF THE INVENTION

In numerous environments, there is a need to measure relative rotation between elements of a machine. For example, rotation sensors are used for jet engine main shafts, machine tool spindles, etc. Another application for such sensors is for anti-lock braking systems (ABS) which are increasingly popular on present day motor vehicles. Such systems are provided to automatically prevent wheel lock-up during hard braking maneuvers so that vehicle stability and directional control can be maintained. A critical feature of an ABS is a wheel speed sensor which provides an output to an ABS controller related to wheel rotation. Many passenger cars have such a sensor for each of their four wheels. Through such inputs, the braking system controller can determine if a wheel lock-up condition has occurred or is being approached and thus control the braking system. Wheel speed sensors are also used to provide inputs for traction control systems which reduce wheel spin during acceleration.

Numerous designs of ABS wheel speed sensors are presently known. Such sensors generally consist of a rotating part (rotor) in close proximity to a stationary part (stator) The rotating part, or "tone ring", has features which can be sensed as they pass the stationary part. Such features are typically ferromagnetic teeth, as on a gear, or magnetic poles which have been applied to the part. The stationary part includes a transducer which can detect the passing of the features of the tone ring as the tone ring rotates. The detection is indicated by an electrical signal which is emitted by the transducer. The transducer may be a variable reluctance device, Hall effect device, magneto-restrictive device, or of some other construction. Generally, the transducer is a device which senses magnetic fields or changing magnetic fields. Variable reluctance transducers are referred to as "passive" sensors in that they generate a voltage without being energized by an external source. "Active" sensors such as a Hall effect device are energized by an externally applied voltage and provide an output responsive to the magnetic fields passing through them.

One problem with present day wheel speed sensor designs based on magnetic field effects is their sensitivity to variations in the air gap between the rotor and stator. One type of magnetic field effect sensor includes a magnetized tone ring which rotates with the wheel bearing. The magnetic poles or ferromagnetic features of present wheel speed sensor tone rings (rotors) are generally configured to be either axial or radial. Therefore, present day stators are generally configured to read the axial magnetic poles from the top or bottom surface of the tone ring. However, as the tone ring rotates with the wheel, the gap between the tone ring and stator tends to vary due to vibrations and other factors. As the gap increases, the amount of magnetic field read, and thus the resulting output from the stator, decreases. Furthermore, the air gaps generally vary in a random manner at random times. These variations can affect the accuracy of the wheel speed sensor.

In modern day motor vehicle design, efficiency of packaging, light weight, ease of assembly, and reliability are of paramount importance. Although prior art sensors have been implemented, designers of such systems are constantly striving to increase their reliability, increase output signal strength, reduce packaging space requirements, facilitate production, assembly and calibration, all the while seeking to reduce their cost. Another principal concern is protecting the sensor elements from contaminants and environmental exposure. Road debris such as dirt, dust, salt and water can damage an unprotected sensor. In addition, the sensor system encounters wear debris and extreme temperatures radiated from the braking surfaces. A present trend in wheel speed sensor design is to integrate the sensor into a wheel bearing assembly, enabling the system to be aligned and tested prior to being shipped to the vehicle manufacture. Such an integrated configuration simplifies vehicle assembly on the assembly line and should increase reliability.

Thus, there is a need for an improved wheel speed sensor configured to reduce the effects of variations in the air gap between the rotor and stator. There is also a need for an improved wheel speed sensor which is easier and less expensive to produce. There is a further need for an improved wheel speed sensor having additional surface area for improving the press-fit strength of the sensor/bearing interface or the sensor/seal interface. There is a still further need for an improved wheel speed sensor which meets minimum packaging space requirements.

SUMMARY OF THE INVENTION

The present invention provides an annular speed sensor which can be implemented as a motor vehicle wheel speed sensor having an efficient magnetic configuration to provide a high level of electrical output even at relatively low wheel speeds. The wheel speed sensor is incorporated into bearing components to provide a compact and efficient hub and bearing assembly. Moreover, the construction of the hub and bearing of this invention provides a sealed environment for the speed sensor.

One object of the present invention is to provide an improved wheel speed sensor configured to reduce the effects of variations in the axial air gap between the rotor and stator.

Another object of the present invention is to provide an improved wheel speed sensor which is easier and less expensive to produce.

It is a further object of the present invention to provide an improved wheel speed sensor having additional surface area for improving the press-fit strength of the sensor/bearing interface or the sensor/seal interface.

It is a still further object of the present invention to provide an improved wheel speed sensor which meets minimum packaging space requirements.

In order to achieve the foregoing objects, the present invention provides an improved wheel speed sensor comprising a multipole tone ring, having axial and radial magnetic poles and a stator having axial and radial field receiving features to read the axial and radial magnetic poles as the tone ring rotates. The sensor is configured to minimize the effects of variations in the air gap between the rotor and stator to provide an accurate and reliable wheel speed signal even at relatively low wheel speeds. Even though the axial air gap may vary, the radial air gap, between the tone ring and the radial receiving features will likely not vary in the same way or at the same time, thus providing a more accurate and reliable signal. Further, when the radial air gap does vary, some of the radial receiving features will be closer to the tone ring and some will be farther away. Since all of the receiving features contribute to the signal produced, the net effect of the air gap variation is small.

The receiving features comprise stator teeth. The axial fields are read by teeth positioned adjacent to the axial surface of the tone ring and the radial fields are read by teeth facing the inner radial surface of the tone ring. The radial fields and radial receiving features make the sensor less sensitive to the axial air gap between the rotor and stator and therefore make the sensor reading more accurate and reliable.

The design of the radial field receivers of the present invention provides more surface area along the inner or outer diameter of the stator than the axial field receivers presently used. The increased surface area improves the press-fit strength of the sensor/bearing interface or the sensor/seal interface, whichever uses that surface, when the sensor is incorporated into a bearing assembly.

Another advantage of the present invention is that the sets of teeth can be designed with less stringent requirements for their circumferential alignment, as long as the fields on the tone ring are aligned circumferentially to the teeth. This also decreases the cost of producing the sensor of the present invention.

Further objects, features and advantages of the invention will become apparent from a consideration of the following description and the appended claims when taken in connection with the accompanying drawings.

BRIEF DESCRIPTION OF THE DRAWINGS

FIG. 3 is a partial pictorial view of an embodiment of the annular sensor having staggered stator teeth and particularly showing the axial and radial receiving features;

FIG. 4 is an enlarged partial view of the tone ring of the present invention, for use with the annular sensor having staggered stator teeth, schematically showing the axial and radial applied magnetic fields;

FIG. 5 is a partial view of a tone ring, for use with the annular sensor having staggered stator teeth, showing the magnetic polarity of the radial magnetic areas.

DETAILED DESCRIPTION OF THE PREFERRED EMBODIMENT

Figure 1:
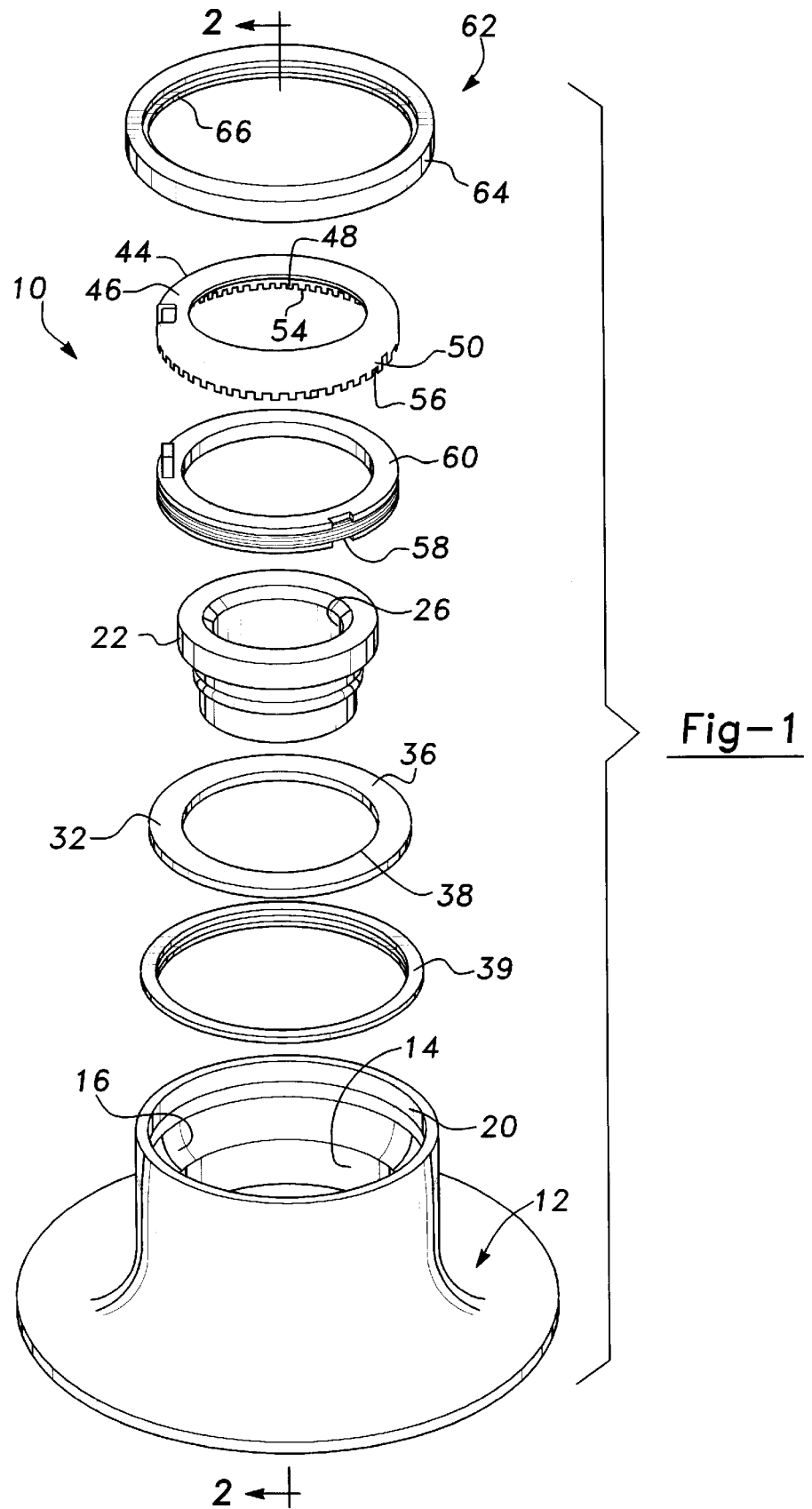
FIG. 1 is an exploded pictorial view of a hub and bearing assembly in accordance with this invention.
Figure 2:
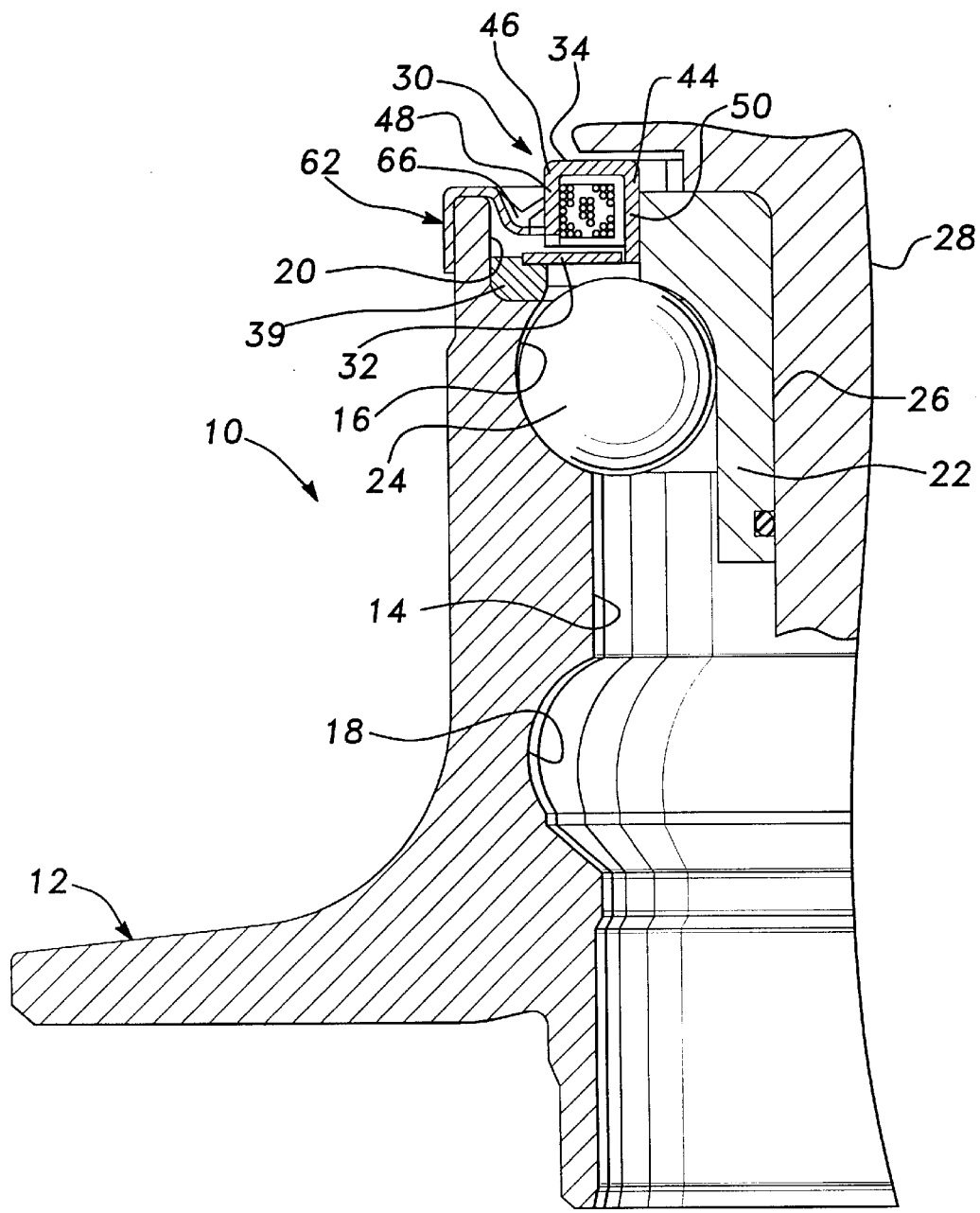
FIG. 2 is a partial cross-sectional view of the hub and bearing assembly of FIG. 1, shown in an assembled fashion.

An annular speed sensor implemented in a hub and bearing assembly in accordance with this invention is shown in FIGS. 1 and 2 and is generally designated by reference number 10. Hub and bearing assembly 10, as shown in the Figures, is particularly adapted for use on a non-driven axle of a motor vehicle. The concepts of the present invention are, however, applicable to hub and bearing assemblies for driven axles and for other non-automotive applications.

Hub 12 has a radially extending flange which provides a mounting surface for a vehicle wheel (not shown). Hub 12 also defines an inside cylindrical surface 14 and a pair of roller bearing element races including inboard outer race 16 and outboard outer race 18. Hub 12 also has a stepped enlarged bore section 20 which, as will be explained in detail below, provides an area for mounting of a wheel rotation sensor.

Bearing inner race 22 is positioned inside hub 12, engages a series of ball bearing elements 24 and defines the inboard bearing of the assembly. The outboard inner race is not shown in the Figures and would be of conventional construction, defining an inner surface for engagement with an outboard series of ball elements. Inner race 22 also has an inside cylindrical passageway 26 which is provided for mounting to a non-rotating spindle 28 of the vehicle. In operation, a vehicle wheel mounted to hub 12 rotates, while inner race 22 is fixed relative to spindle 28. A principal feature of hub and bearing assembly 10 in accordance with this invention is the provision of sensor 30 for the detection of wheel rotation. As previously explained, sensor 30 provides an output for control of an ABS or traction control system for a vehicle. Sensor 30 generally comprises a rotor and stator in the form of tone ring 32 and annular transducer 34, respectively. In addition to FIGS. 1 and 2, reference will be made to FIGS. 3, 4, 5, 8, 9, and 10 in a description of sensor 30.

Figure 8:
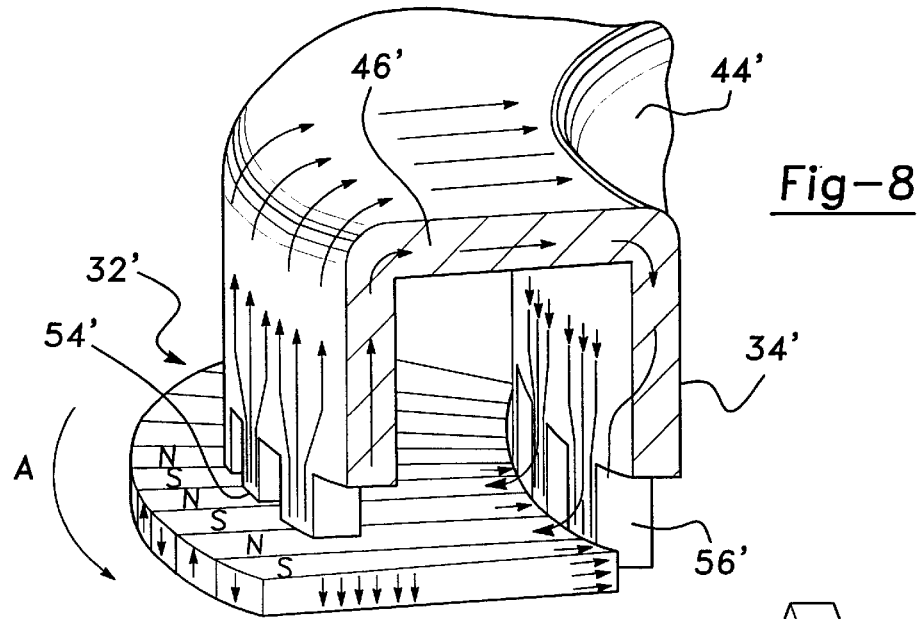
FIG. 8 is a partial pictorial view of an embodiment of the annular sensor having aligned stator teeth and particularly showing the axial and radial receiving features.
Figure 9:
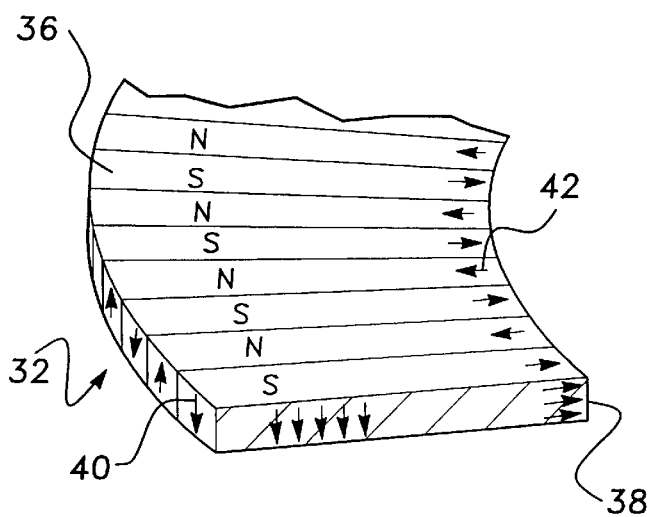
FIG. 9 is an enlarged partial view of the tone ring of the present invention, for use with the annular sensor having aligned stator teeth, schematically showing the axial and radial applied magnetic fields.

Tone ring 32 is a permanent magnet in a disk configuration and has a radial face surface 36 and an inner diameter axial face surface 38. Best shown in FIG. 2, tone ring 32 is carried by a tone ring retainer 39 which is press-fit into hub bore 20. In an alternate design, tone ring 32 could be directly fit into hub bore 20. FIGS. 4 and 9 show that tone ring 32 defines areas of magnetic polarity arranged along radials with respect to the center of rotation of the hub bearing assembly. The polarity of tone ring 32 alternates along both the radial face surface 36 and the axial face surface 38 in a circumferential direction. Axial magnetic poles 40 are applied through the radial face surface 36 and radial magnetic poles 42 are applied through the axial face surface 38 of the tone ring 32. FIG. 4 schematically shows the applied magnetic fields for tone ring 32 when used with the annular sensor having staggered teeth as shown in FIG. 3 and explained below. Alternatively, FIG. 9 schematically shows the applied magnetic fields for tone ring 32 when used with the annular sensor having aligned teeth as shown in FIG. 8 and explained later. While various materials for forming tone rings can be implemented, an alloy of Fe—Cr—Co is used in the present embodiment.

Annular transducer 34 has a case 44 in the shape of a side-opening shell, having a radial side wall 46 and a pair of cylindrical walls including axial receiving wall 48 and radial receiving wall 50. Walls 48 and 50 are separated to define an annular cavity 52. Both walls 48 and 50 define a plurality of extending teeth 54 and 56, respectively, arranged around their perimeter. FIG. 3 shows a configuration which is referred to as having staggered teeth wherein teeth set 54 are radially offset from teeth set 56. An alternate embodiment is shown in FIG. 8 which has aligned teeth wherein teeth set 54 and teeth set 56 are radially aligned. FIG. 8 does not include bobbin 60 for clarity sake. As shown in FIGS. 1 and 3, cavity 52 accommodates a coil winding 58 which is wrapped within bobbin 60. Preferably, the number of teeth of each of walls 48 and 50 are equal to the number of regions of tone ring 32 which are magnetized with a particular magnetic polarity.

Figure 10:
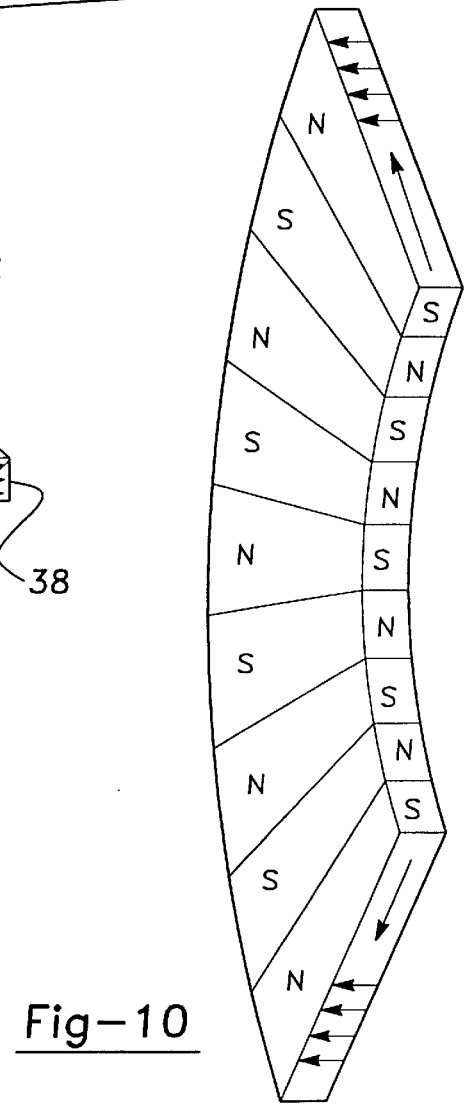
FIG. 10 is a partial view of a tone ring, for use with the annular sensor having aligned stator teeth, showing the magnetic polarity of the radial magnetic areas.

As tone ring 32 rotates (as indicated by curved arrow A in FIGS. 3 and 8), transducer teeth 54 and 56 are magnetically coupled to alternating magnetic poles. This induces a reversing magnetic field through transducer case 44. In FIG. 3, arrows along the surface of case 44 and tone ring 32 show the lines of magnetic flux for the illustrated relative orientation between case 44 and tone ring 32. Upon relative rotation of tone ring 32, the flux field through annular transducer case 44 induces an electromagnetic force (voltage) within coil winding 58. Poles 40 and 42 and teeth 54 and 56 respectively, are aligned such that the first set of teeth 54 are magnetically coupled to the axial poles 40, and the second set of teeth 56 are magnetically coupled to the radial poles 42. As shown in FIG. 3, teeth 56 extend past and are separated from the axial face surface 38 of the tone ring 32 by a gap 55. Furthermore, the polarity of poles 40 and 42 is configured such that as teeth 54 are magnetically coupled to a magnetic pole of one polarity, teeth 56 are magnetically coupled to a magnetic pole of opposite polarity. The polarity of the radial magnetic areas is shown in FIG. 5 for the tone ring 32 which is utilized with a stator having teeth set 54 and teeth set 56 radially offset. As can be appreciated, when the teeth of teeth set 54 are aligned with the north pole of the magnetic areas, the teeth of teeth set 56 are offset and are aligned with the south pole of the next adjacent magnetic area. The polarity of the magnetic areas is shown in FIG. 10 for the tone ring 32 which is utilized with a stator having teeth set 54 and teeth set 56 radially aligned. As such, when the teeth of teeth set 54 are aligned with the north pole of the magnetic areas, the teeth of teeth set 56 are radially aligned and align with the south pole at the opposite end of the same magnetic area.

In the present invention the tone ring contains both radial fields on the axial surface of the tone ring as well as axial fields on the radial surface, therefore, the teeth 54 and 56 need not be radially staggered with each other. The only requirement is that the teeth 54 and 56 be aligned to read opposite magnetic poles. Thus in the present invention, the teeth can be either radially aligned or radially staggered. This allows the teeth 54 and 56 to be formed in independent operations thereby making them less expensive to produce.

Annular transducer 34 is fixed relative to inner race 22, preferably through press-fitting it onto an external cylindrical surface of inner race 22 as shown in FIG. 2. The bearing rolling ball elements 24 and sensor 30 are protected by seal 62. Seal 62 has a retainer ring 64 which is press-fit onto hub 12 and mounts an elastic lip 66 which contacts transducer case 44. Since transducer 34 is oriented such that the open portion of case 44 is facing ball elements 24, the radial side wall 46 and walls 48 and 50, combine to enclose and protect the bearing elements 24. This configuration also has the advantage that sensor 30 is readily accessible for service or replacement.

Figure 6:
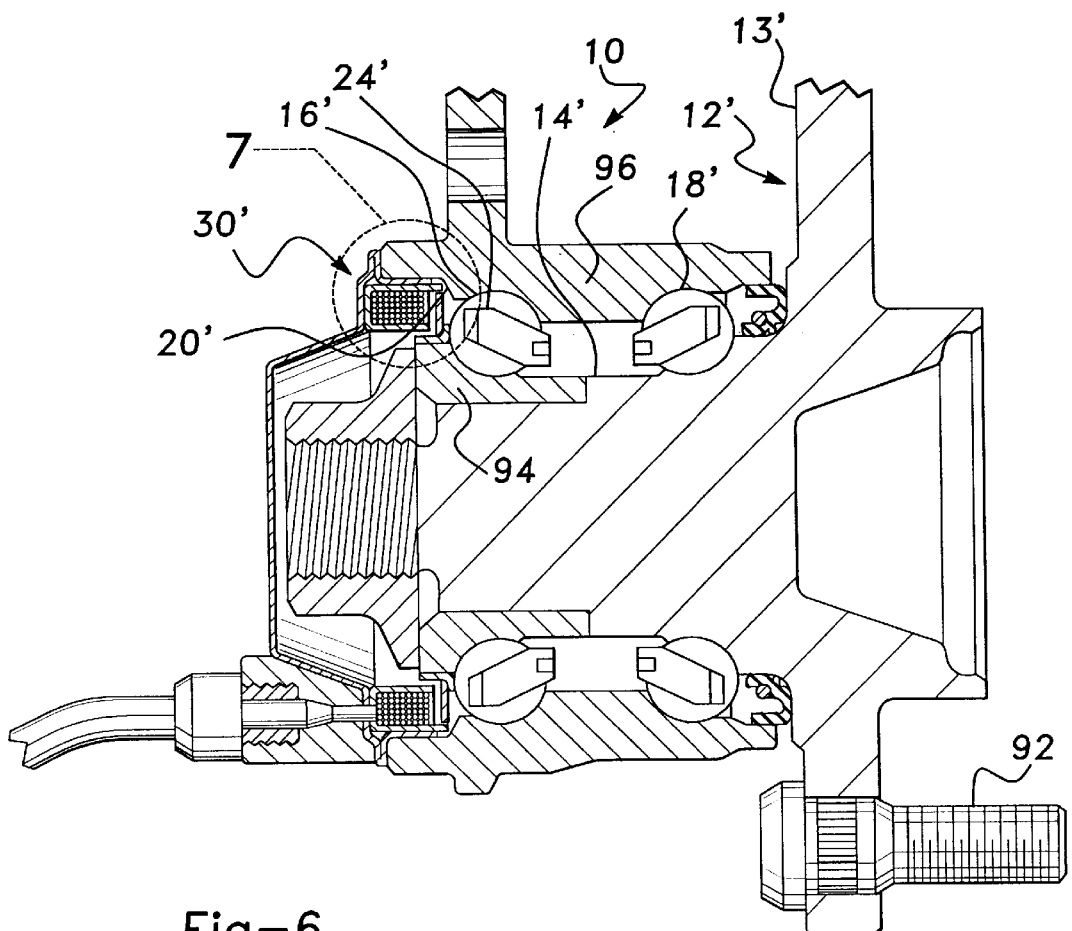
FIG. 6 is a cross-sectional view of an alternative hub and bearing assembly of the present invention.
Figure 7:
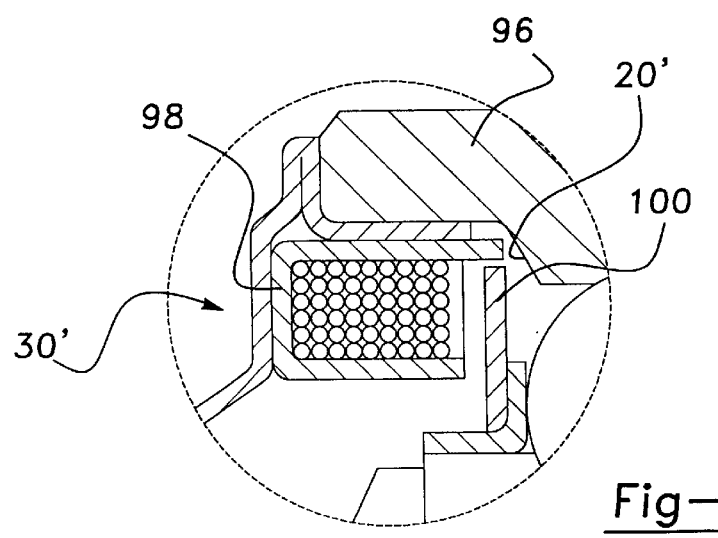
FIG. 7 is an enlarged partial view of the sensor of the present invention as indicated in FIG. 6.

FIGS. 6 and 7 illustrate an alternative hub and bearing assembly 10'. A principal feature of hub and bearing assembly 10' in accordance with this invention is a provision of sensor 30' for detection of wheel rotation. The hub 12' has a radially extending flange 13' which provides a mounting surface for a vehicle wheel (not shown). The wheel is mounted over and retained by a plurality of lugs 92 which are attached to flange 13'. Hub 12' also defines an inside cylindrical surface 14' and a pair of roller bearing element races including inboard race 16' and outboard race 18'. Hub 12' also has a stepped enlarged bore section 20' which provides an area for mounting a wheel rotation sensor.

Bearing inner race 94 is positioned inside hub 12', engages a series of ball bearing elements 24' and defines the inboard bearing of the assembly. In operation, inner race 94 rotates with the vehicle wheel while outer race 96 remains stationary relative to the inner race 94, race 96 being attached to a spindle (not shown). As best shown in FIG. 7, annular stator 98 is secured in a stationary position to outer race 96, while tone ring 100 rotates with inner race 94 thereby rotating with the vehicle wheel.

Figure 11:
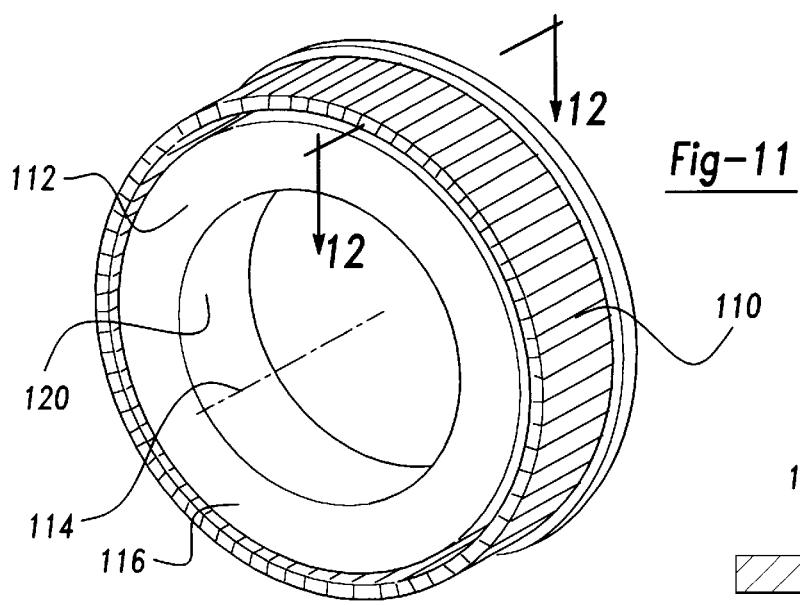
FIG. 11 is a perspective view of an alternative embodiment of the present invention having the tone ring coaxial with and radially outward of the stator.
Figure 12:
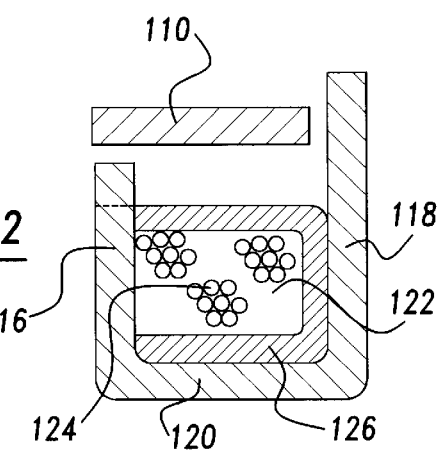
FIG. 12 is a section through the embodiment of FIG. 11 taken along line 12—12.

FIGS. 11 and 12 illustrate an alternative embodiment wherein a tone ring 110 is coaxial with an annular transducer 112. As shown, tone ring 110 is a ring like disk spaced about axis 114. Annular transducer 112, also spaced about axis 114, is positioned radially inward of tone ring 110 and is positioned such that walls 116 and 118 extend radially outward from an annular wall 120. As in the prior described embodiments, a cavity 122 is formed in annular transducer 112 and accommodates a coil winding 124 which is wrapped within bobbin 126 as previously described in the prior embodiments. Tone ring 110 and annular transducer 112 of the present embodiment can be configured to have either staggered or aligned teeth as previously disclosed for the prior embodiments.

Figure 13:
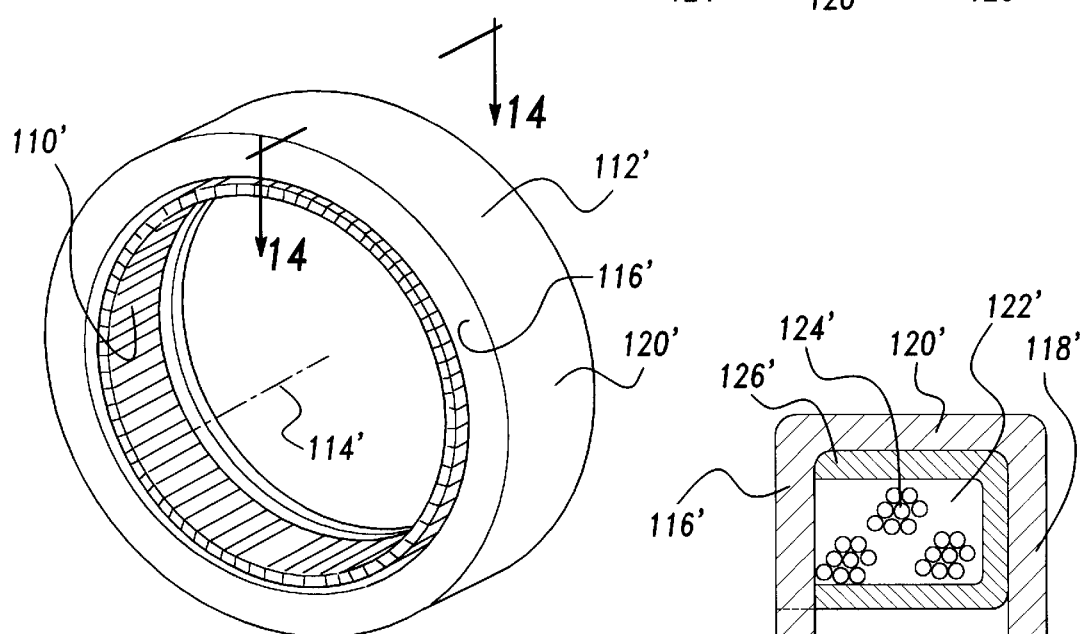
FIG. 13 is a perspective view of an alternative embodiment of the present invention having the tone ring coaxial with and radially inward of the stator.
Figure 14:
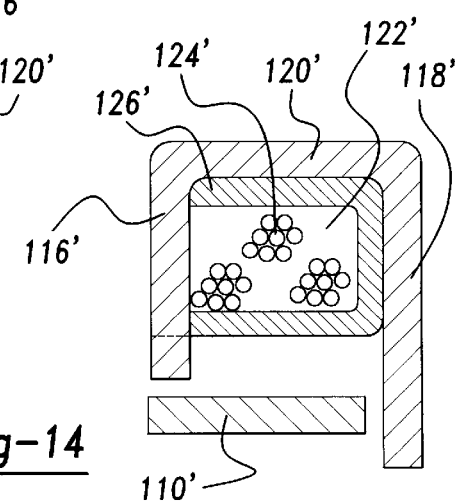
FIG. 14 is a section through the embodiment of FIG. 13 taken along line 14—14.

FIGS. 13 and 14 illustrate an alternative embodiment wherein a tone ring 110' is coaxial with an annular transducer 112'. As shown, tone ring 110' is a ring like disk spaced about axis 114'. Annular transducer 112', also spaced about axis 114', is positioned radially outward of tone ring 110' and is positioned such that walls 116' and 118' extend radially inward from an annular wall 120'. As in the prior described embodiments, a cavity 122' is formed in annular transducer 112' and accommodates a coil winding 124' which is wrapped within bobbin 126' as previously described in the prior embodiments. Tone ring 110' and annular transducer 112' of the present embodiment can be configured to have either staggered or aligned teeth as previously disclosed for the prior embodiments.

It is to be understood that the invention is not limited to the exact construction illustrated and described above, but that various changes and modifications may be made without departing from the spirit and scope of the invention as defined in the following claims.

We claim:

1. An annular speed sensor for detecting movement or position of a rotating part, the sensor comprising:

a disk having major radial faces and a thickness and having regions of axial magnetic poles comprising a plurality of axial magnetic poles which alternate in polarity and regions of radial magnetic poles comprising a plurality of radial magnetic poles which alternate in polarity, said disk being configured to rotate with said rotating part;

an annular stator having axial and radial field receiving features, said axial field receiving features arranged relative to said axial magnetic pole region such that said axial field receiving features are magnetically coupled to axial magnetic poles of said axial magnetic pole region and said radial field receiving features arranged relative to said radial plate radial magnetic pole region such that said radial field receiving features are magnetically coupled to radial magnetic poles of said radial magnetic pole region whereby an alternating magnetic flux passes through said stator in response to said rotation of said disk thus inducing an alternating voltage indicative of the speed of rotation of said disk and correspondingly the part; and wherein said annular stator further comprises a case made of a ferromagnetic material having a conductive winding within said case.

2. A sensor according to claim 1 wherein said axial and radial field receiving features comprise teeth defined by said ferromagnetic case material wherein said teeth are arranged so that as each said axial field receiving feature is coupled to an axial magnetic pole each said radial field receiving feature is coupled to a radial magnetic pole of opposite polarity.

3. A sensor according to claim 2 wherein said disk defines an axial face and a radial face, said plurality of radial magnetic poles being located on said axial face and said plurality of axial magnetic poles being located on said radial face, said teeth comprising said radial field receiving features are configured to extend past said radial face adjacent to said axial face.

4. A sensor according to claim 1 wherein said case includes a radially extending side joining an inner cylindrical wall and an outer cylindrical wall, said inner cylindrical wall having a first set of teeth comprising said axial field receiving features, said outer cylindrical wall having a second set of teeth comprising said radial field receiving features.

5. A sensor according to claim 1 wherein said case includes a radially extending side joining an inner cylindrical wall and an outer cylindrical wall, said inner cylindrical wall having a first set of teeth comprising said radial field receiving features, said outer cylindrical wall having a second set of teeth comprising said axial field receiving features.

6. A sensor according to claim 1 wherein said disk is located coaxially inboard of said stator, said stator having a cylindrical outer wall and two radially extending side walls extending inward toward said disk, said side walls including said teeth comprising said axial field receiving features and said radial field receiving features.

7. A sensor according to claim 1 wherein said disk is located coaxially outboard of said stator, said stator having a cylindrical inner wall and two radially extending side walls extending outward toward said disk, said side walls including said teeth comprising said axial field receiving features and said radial field receiving features.

8. A sensor according to claim 1 wherein said sensor is incorporated into a bearing assembly, said bearing assembly having an inner bearing race located radially within an outer bearing race having an axis of rotation, a plurality of rolling bearing elements located radially between said inner and outer bearing races permitting relative rotation between said races, said disk being fixed relative to one of said bearing races and said stator being fixed to the other of said bearing race.

9. A bearing assembly comprising:

an inner bearing race located radially within an outer bearing race having an axis of rotation, a plurality of rolling bearing elements located radially between said inner and outer bearing races permitting relative rotation between said races, a tone ring having regions of axial magnetic poles which alternate in polarity and radial magnetic poles which alternate in polarity, said tone ring being fixed relative to one of said bearing races;

an annular transducer fixed to the other of said bearing races, said transducer having a case made of a ferromagnetic material defining axial and radial field receiving teeth, said axial field receiving teeth arranged relative to said tone ring axial magnetic poles such that said axial field receiving teeth are magnetically coupled to said axial magnetic poles and said radial field receiving teeth arranged relative to said radial magnetic poles such that said radial field receiving teeth are magnetically coupled to said radial magnetic poles, and said axial and radial field receiving teeth being coupled to said tone ring such that said axial and radial magnetic poles are exposed to said axial and radial teeth respectively upon relative rotation between said tone ring and said transducer; and a conductive winding within said transducer whereby an alternating magnetic flux passes through said transducer in response to said relative rotation inducing an alternating voltage in said winding indicative of speed of said relative rotation.

10. A bearing assembly according to claim 9 wherein said bearing assembly is incorporated within a vehicle wheel assembly.

11. A bearing assembly according to claim 10 wherein said inner bearing race is coupled to a non-rotatable vehicle spindle and said outer bearing race is coupled to said vehicle wheel assembly.

12. A bearing assembly according to claim 11 wherein said outer bearing race defines an inside cylindrical surface which receives said tone ring.

13. A bearing assembly according to claim 10 wherein said outer bearing race is coupled to a non-rotatable vehicle spindle and said inner bearing race is coupled to said vehicle wheel assembly.

14. A bearing assembly according to claim 13 wherein said inner bearing race defines an inside cylindrical surface which receives said tone ring.

15. A bearing assembly according to claim 9 wherein said transducer case defines a radially extending side joining an inner cylindrical wall defining said axial field receiving teeth and joining an outer cylindrical wall defining said radial field receiving teeth, said transducer case being oriented with said axial and radial field receiving teeth extending toward said rolling bearing elements, said tone ring positioned between said rolling bearing elements and said axial field receiving teeth, said radial field receiving teeth extending adjacent to said tone ring.

16. A bearing assembly according to claim 9 wherein a seal is affixed to said outer bearing race to which said tone ring is attached having a sealing lip in sealing engagement with said transducer.

17. A bearing assembly according to claim 9 wherein a seal is affixed to said inner bearing race to which said tone ring is attached having a sealing lip in sealing engagement with said transducer.

18. A bearing assembly according to claim 9 further comprising a seal having a sealing lip for enclosing said rolling bearing elements and said tone ring.

* * * * *